3,170,928
PHENYLPROPANOL DERIVATIVES AND THEIR PRODUCTION
Joseph H. Burckhalter, Ann Arbor, Mich., assignor to Parke, Davis & Company, Detroit, Mich., a corporation of Michigan
No Drawing. Filed Mar. 10, 1961, Ser. No. 94,718
7 Claims. (Cl. 260—294.8)

This invention relates to phenylpropanol derivatives and to methods for their production. In particular, the invention is concerned with novel phenylpropanol derivatives of the formula

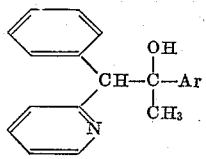

where Ar can represent a 4-chlorophenyl, 4-methoxyphenyl, 3-chlorophenyl, 2,4-dichlorophenyl, 4-fluorophenyl, 2,4-dimethylphenyl, 4-methylthiophenyl, or 4-pyridyl radical.

In accordance with the invention, the phenylpropanol products of the foregoing formula can be prepared by the reaction of an aryl methyl ketone of the formula

with an alkali metal derivative of 2-benzylpyridine under anhydrous conditions followed by hydrolysis of the resulting reaction product; where Ar is as defined before. In carrying out this process, the aryl methyl ketone is reacted with an alkali metal derivative of 2-benzylpyridine, representatively the lithium or sodium derivative, in a non-hydroxylic solvent such as an ether or a hydrocarbon. Specific solvents suitable for use include ether, benzene, toluene, tetrahydrofuran and mixtures of the same. The alkali metal derivative of 2-benzylpyridine can be formed directly in the reaction mixture and used without isolation if desired. It is obtained by such means as reacting 2-benzylpyridine with phenyllithium, sodamide, sodium hydride, triphenylmethyl sodium or other reactive alkali metal derivative. The reaction of the aryl methyl ketone with the alkali metal derivative of 2-benzylpyridine proceeds rapidly at room temperature or below and depending on the solvent, a temperature within the range of about −20° to 140° C. can be used although it is most practical to carry out the reaction in a low-boiling ether between room temperature and the reflux temperature of the reaction mixture. The desired product is then obtained following hydrolysis of the mixture with water or other aqueous medium. A dilute solution of ammonium chloride is the preferred reagent for hydrolysis. The products of the invention are produced in stereoisomeric forms and the individual diastereoisomers are obtained by fractional crystallization of the reaction product.

The products of this invention have useful pharmacological properties. They are hypocholesteremic agents which upon administration cause a marked fall in blood cholesterol with minimal side effects. The products are active upon oral administration and cause a fall in blood cholesterol which is not transitory but which is maintained over a prolonged period. A particular advantage of these novel products is that they have very low estrogenic activity thereby affording a high degree of separation of hypocholesteremic activity from the estrogenic side effect which normally accompanies it. The products of this invention have an unexpectedly favorable ratio of hypocholesteremic to estrogenic activity when compared with other compounds of related structure.

This is a continuation-in-part of copending application Serial No. 860,639, filed December 21, 1959, now abandoned.

The invention is illustrated but not limited by the following examples:

Example 1

To 200 ml. of anhydrous ether in a reaction vessel flushed with nitrogen and protected from atmospheric moisture is added 0.7 g. of finely divided lithium wire. With efficient stirring, 7.9 g. of freshly distilled bromobenzene in 50 ml. of anhydrous ether is then added at such a rate that the reaction mixture is maintained under gentle reflux. Stirring is continued until all of the lithium has reacted and to the solution of phenyllithium which thereby results is added 8.5 g. of freshly distilled 2-benzylpyridine in 50 ml. of anhydrous ether in order to form the lithium derivative of 2-benzylpyridine. The deep red solution which results is stirred for 30 minutes and then while stirring is continued, 7.5 g. of 4-methoxyacetophenone in 50 ml. of anhydrous ether is added over a 15-minute period. The solution is then washed with 100 ml. of water containing 2.8 g. of ammonium chloride. Any product which separates at this point is collected by filtration and the ethereal phase is separated and combined with two 100 ml. ether extracts of the aqueous phase. The ethereal extracts are combined and evaporated to dryness, and the solid obtained is combined with that previously separated by filtration. This product is 1-(2-pyridyl)-1-phenyl-2-(4-methoxyphenyl)-propan-2-ol; after several crystallizations from methanol (avoid heating) M.P. 154–156° C. This product has the structural formula

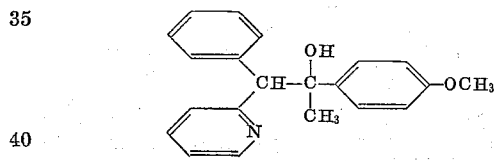

By carrying out fractional crystallizations on the crystallization liquors another product is obtained, M.P. 135–137° C.; this is the lower melting diastereoisomer.

Example 2

To 200 ml. of anhydrous ether in a reaction vessel flushed with nitrogen and protected from atmospheric moisture is added 0.7 g. of finely divided lithium wire. With stirring, 7.9 g. of freshly distilled bromobenzene in 50 ml. of anhydrous ether is then added at such a rate that gentle reflux is maintained. Stirring is continued after the addition is complete until all of the lithium has reacted to give a solution of phenyllithium. Following this, 8.5 g. of freshly distilled 2-benzylpyridine in 50 ml. of anhydrous ether is added and the resulting deep red solution which contains the lithium derivative of 2-benzylpyridine is stirred for 30 minutes and then treated with 7.8 g. of 4-chloroacetophenone in 50 ml. of anhydrous ether, added over a 15-minute period. The solution is washed with 100 ml. of water containing 2.8 g. of ammonium chloride, and any product which separates at this point is collected on a filter. The aqueous and ethereal phases are separated and the aqueous phase is extracted with two 100 ml. portions of ether. The ethereal extracts are combined and evaporated to give an additional quantity of product which is combined with that previously collected by filtration. This product is 1-(2-pyridyl)-1-phenyl-2-(4-chlorophenyl)-propan-2-ol; after several crystallizations from methanol, M.P. 152–154° C. This product has the structural formula

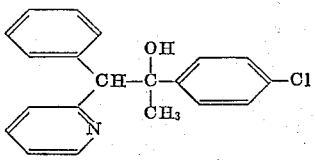

Example 3

Finely cut lithium ribbon (22.2 g.) is added to 500 ml. of dry ether in a reaction vessel flushed with nitrogen. With vigorous stirring, 251 g. of bromobenzene in 1000 ml. of dry ether is added at such a rate that the reaction mixture is maintained under gentle reflux. Stirring is continued until practically all of the lithium has reacted to give a solution of phenyllithium. This solution is chilled in an ice bath and treated with 256 g. of 2-benzylpyridine in 500 ml. of dry ether to form a deep red solution containing the lithium derivative of 2-benzylpyridine. This red solution is stirred for one hour at 20–25° C. and, with continued stirring, 223 g. of 3-chloro-acetophenone in 500 ml. of dry ether is slowly added with external cooling to moderate the reaction. The reaction mixture is allowed to warm to room temperature and stirred for two more hours. With cooling, 500 ml. of saturated aqueous ammonium chloride is cautiously added and after thorough mixing and decomposition of the last traces of lithium metal the ether phase is separated, washed with about 300 ml. of water, dried over anhydrous magnesium sulfate, filtered and concentrated in vacuo to a small volume. The 1-(2-pyridyl)-1-phenyl-2-(3-chlorophenyl)-propan-2-ol which separates at this point is collected; after several crystallizations from ether, M.P. 134–136° C. This product has the structural formula

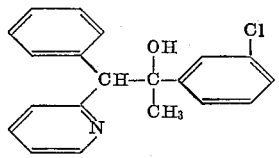

By carrying out fractional crystallizations on the crystallization liquors the lower melting diastereoisomer is obtained, M.P. 108–110° C.

Example 4

Using the procedure of Example 3, but substituting 1.44 moles of each of the following ketones, for the 3-chloro-acetophenone, the following additional compounds are obtained.

From 2,4-dichloroacetophenone there is obtained 1-(2-pyridyl)-1-phenyl-2-(2,4 - dichlorophenyl) - propan-2-ol; M.P. 142–144° C. after several crystallizations from ethanol. By fractional crystallizations carried out on the crystallization liquors there is also obtained the higher melting diastereoisomer; M.P. 152–153° C.

From 4-acetylpyridine there is obtained 1-(2-pyridyl)-1-phenyl-2-(4-pyridyl)-propan-2-ol; M.P. 118–119° C. after several crystallizations from carbon tetrachloride.

From 4-fluoroacetophenone there is obtained 1-(2-pyridyl) - 1 - phenyl - 2 - (4 - fluorophenyl) - propan-2-ol; M.P. 116–118° C.

From 4-methylthioacetophenone there is obtained 1-(2-pyridyl) - 1 - phenyl - 2 - (4 - methylthiophenyl)-propan-2-ol; M.P. 145–147° C. after crystallization from ether. From the ether crystallization liquor there is obtained a yellow oil which can be crystallized from heptane to give the lower melting diastereoisomer; M.P. 83–85° C.

From 2,4-dimethylacetophenone there is obtained 1-(2-pyridyl)-1-phenyl - 2 - (2,4 - dimethylphenyl)-propan-2-ol; M.P. 148–149° C. after crystallizations from ethanol.

I claim:
1. 1 - (2 - pyridyl) - 1 - phenyl-2-(4-methoxyphenyl)-propan-2-ol.
2. 1 - (2 - pyridyl) - 1 - phenyl - 2 - (4-chlorophenyl)-propan-2-ol.
3. 1 - (2 - pyridyl) - 1 - phenyl - 2 - (3-chlorophenyl)-propan-2-ol.
4. 1-(2-pyridyl) - 1 - phenyl - 2 - (2,4-dichlorophenyl)-propan-2-ol.
5. 1-(2 - pyridyl) - 1 - phenyl - 2 - (4-fluorophenyl)-propan-2-ol.
6. 1 - (2 - pyridyl) - 1 - phenyl-2-(2,4-dimethylphenyl)-propan-2-ol.
7. 1 - (2 - pyridyl) - 1 - phenyl-2-(4-methylthiophenyl)-propan-2-ol.

References Cited in the file of this patent
UNITED STATES PATENTS

| | | |
|---|---|---|
| 2,727,895 | Sperber et al. | Dec. 20, 1955 |
| 2,750,392 | Cislak | June 12, 1956 |
| 2,966,494 | Allen et al. | Dec. 27, 1960 |